United States Patent Office 3,393,321
Patented July 16, 1968

3,393,321
VISUAL RANGE MEASURING SYSTEM INCLUD-
ING A PLURALITY OF SPACED LAMPS
Frank Früngel, Herwigredder 105a,
Hamburg-Rissen, Germany
Filed July 19, 1965, Ser. No. 472,897
Claims priority, application Germany, July 18, 1964,
F 43,496
15 Claims. (Cl. 250—217)

The present invention relates to a system for measuring visual range. More particularly, the invention relates to a system for measuring visual range on land or sea.

A known system for measuring visual range involves the determination of transmission from a determined measuring base. Another known system for measuring visual range utilizes a row or line of lights, usually along a landing strip of an air field. The lights are successively scanned by photoresponsive or photosensitive receivers. The input lens of the photoresponsive receiver is moved back and forth along the line of lights and functions, with an appropriate amplifier, to indicate or measure the light from the light source farthest from said receiver which is detectable. A disadvantage of this system is that the moving component or components must be precisely and exactly adjusted. Another disadvantage of this system is that it must be positioned near the landing strip and thus presents a source of danger to aircraft using such landing strip. If the lights are not positioned near the landing strip, however, the direction of greatest intensity of light radiated from the lights or lamps does not include that which leads to the photoresponsive receiver, so that the light radiated by said lamps bypasses said receiver and the indications or measurements provided by said receiver are of light outside the angle of vision of pilots using the landing strip. The visual range measurement provided by the system is thus inaccurate and unreliable.

The lamps of a system for measuring visual range are usually provided with reflectors for amplifying light radiated thereby. When visual range or visibility is reduced such as, for example, by fog, the light beam pattern is blurred due to dispersion, light amplification is reduced, and the visual range or visibility indication or measurement is inaccurate and unreliable.

To overcome the aforementioned disadvantage of the known systems, the individual lamps may be energized to produce light once, twice or periodically and the detectable light-radiating lamps may be counted by a photoresponsive receiver. The lamps may be of incandescent, neon or spark or arc discharge type. An advantage of such a system is the lack of moving component or components. Another advantage of such a system is the elimination of the requirement that the photoresponsive receiver be positioned at a point which is a specified minimum distance from and height above the lamps. This system has a considerable disadvantage which is the need for a complex cable network. In a landing strip of 3.5 kilometers, for example, with the lamps positioned at distances of 100 meters, for example, 35 lamps are utilized and must be energized and deenergized. Such a system requires a cable having a minimum of $2\sqrt{n}$ conductors, where $n$ is the number of lamps, or 12 cables when 35 lamps are utilized. The cable network of an air field is a permanent system which may be altered, modified or enlarged only at prohibitive expense. The visual range or visibility measuring or indicating system must be readily usable at different air fields and under adverse conditions, such as at improvised landing strips and must not tax existing air field facilities or cable networks.

The principal object of the present invention is to provide a new and improved visual range measuring system.

An object of the present invention is to provide a visual range measuring system which is accurate and reliable in operation.

Another object of the present invention is to provide a visual range measuring system which does not utilize existing cable facilities.

Another object of the present invention is to provide a visual range measuring system which is readily usable at different locations on land or sea.

In accordance with the present invention, a system for measuring visual range comprises a plurality of light pulse producing lamps positioned in alignment in spaced relation from each other, the frequency of occurrence of the light pulses produced by each of the lamps being a determined magnitude. A photoresponsive receiver senses all light pulses produced by the lamps within its range of sensitivity. The photoresponsive receiver is positioned in spaced relation from the lamps and has an optical axis at an acute angle with the alignment of lamps in a manner whereby each of the lamps is positioned a determined distance from the photoresponsive receiver corresponding to a determined visual range different from those of the other of the lamps. The photoresponsive receiver includes means for indicating the number of light pulses sensed per unit time, the number of light pulses indicated corresponding to the number of lamps sensed and thereby the visual range. Either the receiver or the lamps should have a narrow angle diaphragm. For power saving efforts on the side of the lamps, these should have the narrow beam radiating diaphragm, the axis of all lamps directed to the receiver, and the receiver has to have a broad angle diaphragm, covering without critical adjustment these directions of all incoming lamp beams. For the purpose of the invention, namely lamp counting, it is without importance whether the lamps or the receiver have the narrow diaphragm. If both parts have narrow angle diaphragms, alignment is too critical and side wind sensitive.

In order that the present invention may be readily carried into effect, it will now be described with reference to the accompanying drawings, wherein.

In the FIGS., the same components are identified by the same reference numerals.

Figure 1:
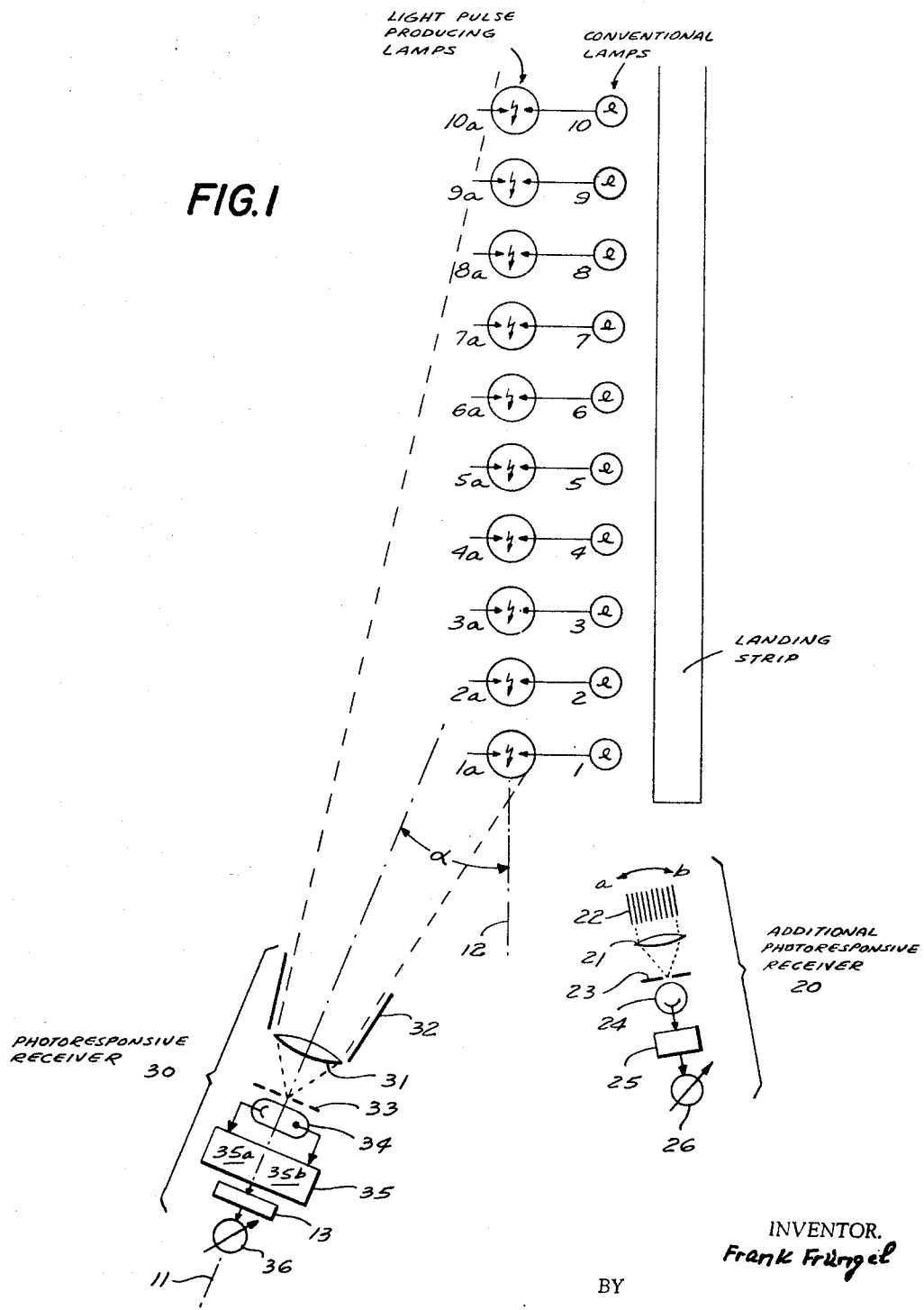
FIG. 1 is a schematic diagram of an embodiment of the visual range measuring system of the present invention.

In FIG. 1, conventional lamps 1, 2, 3, 4, 5, 6, 7, 8, 9, and 10 are aligned along the landing strip or runway or in the area thereof. A light pulse producing lamp is positioned in proximity with each of the lamps 1 to 10. Thus, the aligned light pulse producing lamps 1a, 2a, 3a, 4a, 5a, 6a 7a, 8a, 9a and 10a correspond to the conventional lamps 1, 2, 3, 4, 5, 6, 7, 8, 9 and 10 respectively. The light pulse producing lamps 1a to 10a are energized either by storage batteries or by the same source which energizes the conventional lamps 1 to 10. Each of the lamps 1a to 10a is energized by a voltage supply which comprises a corresponding storage battery and a current stabilizing circuit for providing a substantially constant charging current to the capacitor of the corresponding lamp.

Each of the light pulse producing lamps 1a to 10a produces a very short duration, very high intensity light pulse at a determined rate or frequency in any suitable manner. Each of said light pulse producing lamps 1a to 10a may radiate light pulses of ¼ microsecond duration and may ultilize a capacitor to generate its high intensity, short duration light pulses.

In accordance with the present invention, each of the light pulse producing lamps 1a to 10a may be adjusted to produce light pulses at a rate of frequency determined by the distance of the lamp from a photoresponsive or light responsive receiver 30. Thus, a lamp at a distance of 100 meters from the photoresponsive receiver 30 may be adjusted to radiate one light pulse per second, a lamp at a distance of 1000 meters from said photoresponsive receiver may be adjusted to radiate together with all lamps between 100 and 1000 meters 10 light pulses per second and a lamp at a distance of 2000 meters from said photoresponsive receiver may be adjusted to radiate 20 light pulses per second together with all other lamps between 1000 and 2000 meters. Then the total number of received and/or produced impulse increases linearly with distance. Since the visual range utilized for the lamps is small, for example under 1500 meters, there is no major response difference of the photoresponsive receiver to red, violet, or even ultraviolet or infrared light, so that said lamps may be provided with ultraviolet or infrared filters. The ultraviolet or infrared filters make the light pulses produced by the lamps 1a to 10a invisible to the pilots of aircraft utilizing the landing strip or runway while retaining the sensitivity or response of the photoresponsive receiver to said light pulses. This permits accurate and reliable measurement of visual range or visibility while preventing confusion or disorientation of the pilots.

The photoresponsive or light sensitive receiver 30 is positioned so that its central axis or optical axis 11 lies at a small angle $\alpha$ with a line 12 running through the aligned light pulse producing lamps 1a to 10a. The photoresponsive receiver 30 comprises an input lens 31 and a shade or shield 32 against extraneous light. Instead of this an arrangement as described in col. 2 with narrow beam lamps may be provided. Light sensed from the lamps 1a to 10a is projected into a photo plate, light screen or the like 33 whence it impinges upon a photoresponsive or photosensitive cell 34. The photosensitive cell 34 converts the light into corresponding electrical signals which are amplified in a suitable amplifier 35 which includes stages 35a and 35b. The output of the amplifier 35 is supplied to a multivibrator 13. The multivibrator 13 produces an output signal which is supplied to an indicator or measuring instrument 36.

The multivibrator 13 may comprise any suitable multivibrator which functions in a known manner to produce a determined magnitude of electrical energy at its output each time it changes its state or condition due to the supply of an input pulse thereto. The magnitude of the electrical energy for each switch of the state or condition of the multivibrator is determined by adjustment of the multivibrator circuitry in known manner. A single change of state or condition may, for example, produce a millicoulomb of electrical energy or one milliampere of current, so that 10 changes of state or condition of the multivibrator in a second would produce an output signal having an electrical energy of 10 millicoulombs or a current of 10 milliamperes during 1 second.

The indicator 36 indicates a current for the light sensed from the lamp farthest from the photoresponsive receiver and may be calibrated in visual ranges or visibilities due to the provision of frequencies for the light pulses produced by the lamps 1a to 10a which vary in proportion with the distances of the lamps from the receiver. Any desired type of relationship between the frequency of light pulses produced by the lamps and the distance of the lamps from the photoresponsive receiver such as, for example, a non-linear or logarithmic relationship, may be instituted by appropriate adjustment of the frequency of light pulses produced by each of such lamps. Additionally, for avoiding an over-feeding of the receiver from lamps at small distances, such lamps can have a diaphragm for reducing the light amplitude. Such reduction can be effected too by a smaller discharge capacitor or a damping resistance in the circuit of the lamp.

The photoresponsive receiver 30 detects the light pulses produced by all the lamps, from the closest to the farthest. The farthest lamp is that lamp whose light pulses are the farthest of the light pulses detected or sensed by the photoresponsive receiver 30. There may be lamps positioned even farther from the photoresponsive receiver 30, but if the visibility or visual range is such that the light pulses produced by such farther positioned lamps are not sensed by said receiver, the said receiver is not aware of the existence of such farther positioned lamps and thereby provides an accurate and reliable visibility measurement.

Thus, the total frequency of light pulses sensed by the photoresponsive receiver 30 is the sum of the frequencies of each lamp whose light is sensed by said receiver, from the closest to the farthest sensed lamp. When the frequency of light pulses produced by each lamp is determined, this sum of the frequencies must be considered. If, for example, the closest lamp 1a is positioned at a distance of 100 meters from the photoresponsive receiver 30 and produces light pulses at the rate of one pulse per second and the next farther lamp 2a is positioned at a distance of 200 meters from said receiver and produces light pulses at the same rate of one pulse per second, if the said receiver is able, due to visual range or visibility conditions, to sense only these two lamps, it will receive and indicate 2 pulses per second and thereby indicate a visual range of 200 meters.

Thus, in accordance with the present invention, each of the light pulse producing lamps 1a to 10a may be adjusted to produce light pulses at the same rate or frequency, rather than at a rate determined by the distance of the lamp from the photoresponsive receiver 30. Thus, if a third lamp 3a is positioned at a distance of 300 meters from the photoresponsive receiver 30 and produces light pulses at the same rate of one pulse per second, and a fourth lamp 4a is positioned at a distance of 400 meters from said receiver and produces light pulses at the same rate of one pulse per second, and if the said receiver is able, due to visual range or visibility conditions, to sense the four lamps, it will receive and indicate 4 pulses per second and thereby indicate a visual range of 400 meters. When all the lamps are adjusted to produce light pulses at the same rate, the lamps have a longer service life than when their frequencies increase with distance from the photoresponsive receiver 30.

The light pulses produced by the light pulse producing lamps 1a to 10a must be timed so that they do not occur at the same instant but occur within the cycle of operation of the multivibrator 13 of the photoresponsive receiver 30. This may be accomplished in a simple manner, since visibility or visual range need be measured with an accuracy of but $\pm 10\%$, so that the frequencies or occurrences of the light pulses may therefore be spaced at intervals of $\pm 10\%$ without affecting the accuracy of the visibility measurement. The photoresponsive receiver 30 may be provided with an integration circuit having a very long time constant such as, for example, a 30 second median length, to maintain the basic accuracy regardless of the occurrence of more than one of the light pulses at the same instant.

The system of FIG. 1 for measuring visibility or visual range may be modified so that the light pulse producing lamps are energized via the conventional lamps and the light pulses are produced by the light pulse producing lamps 1a to 10a at frequencies which are varied with variations in brightness or intensity of the conventional lamps 1 to 10. If, for example, each of the lamps is reduced 50% in current or brightness, the sensitivity of a human eye or the photoresponsive receiver 30 to said lamps is reduced. If the assumed visual range is 1000 meters, the light pulse producing lamp 10a connected to the conventional lamp 10 would produce light pulses at half the frequency at which it produced light pulses prior to the 50% reduction of current or brightness of the lamps.

Thus, if the initially adjusted frequency of light pulses produced by the lamp 10a is 10 pulses per second when the associated lamp 10 functions at 100% intensity, the frequency of said light pulses is reduced to 5 pulses per second when the intensity of said associated lamp is reduced 50%. The brightness or intensity of the light pulses produced by the lamp 10a does not vary, but remains constant. However, since the rate of light pulses produced by the lamp 10a is reduced to half its initial rate, the indicator 36 of the photoresponsive receiver 30 will measure half the visual range it would initially. Thus, if the intensity of light of the conventional lamps 1 to 10 is reduced, so that the sensitivity of human or machine is reduced thereby reducing the visual range, the visual range is reduced accordingly in its indication or measurement by the system of the present invention so that the visual range or visibility indication is accurate.

A relatively small number of light pulse producing lamps may be utilized in the visual range measuring system of the present invention. Airline companies have landing visibility minimum standards for their pilots which are sealed at, for example, 50, 100, 200, 300, 500, 800, 1000, 1200 and 1500 meters in accordance with their visibility or visual range requirement for pilots in take-off or landing of aircraft. The number of light pulse producing lamps utilized is determined by these standards. The pilots are not generally concerned with the visual range or visibility as such, but, more particularly, with whether the visibility extends up to or beyond the minimum standards of their companies.

The visual range measuring system of the present invention may be utilized at sea or on any body of water, as well as on land. In such case, the light pulse producing lamps 1a to 10a are supported by any suitable means such as, for example, buoys, on or above the surface of the water and the photoresponsive receiver 30 is usually supported ashore.

Figure 3:
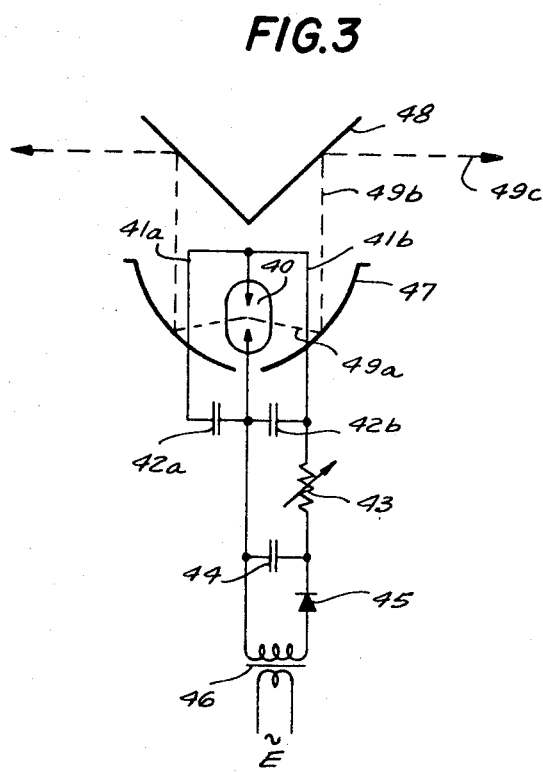
FIG. 3 is a schematic circuit diagram of a lamp which may be utilized in the system of FIG. 1.

The visibility measuring system of the present invention may be utilized as an angular approach visibility indicator for aircraft approaching the landing strip. This is due to the fact that the light pulses produced by each of the light pulse producing lamps are radiated omnidirectionally, as shown in FIG. 3. In order to operate the system of the invention as an angular approach visibility indicator, an additional photoresponsive receiver 20, as shown in FIG. 1, is carried aboard the aircraft. The photoresponsive receiver 20 may replace the photoresponsive receiver 30 or may be utilized conjointly therewith.

As the aircraft approaches the runway, the additional photoresponsive receiver 20 aboard senses more and more lamps. The number of lamps sensed by the receiver 20 is indicative of the visibility of the angle of approach of the aircraft and of the distance from the runway when the lamps are aligned before the runway is reached from the approach direction. At the moment of overflight, the indicator 36 to the ground receiver 30 may be read out by suitable electromagnetic or electronic means so that the angular approach visibility is then indicated. If the lamps are spaced equidistantly from each other, the angular approach indication remains constant for a longer period of time than if the lamps are not equidistantly spaced.

The additional photoresponsive receiver 20 may comprise an input lens 21 and a filter or shield 22 against extraneous light. Light sensed from the lamps 1a to 10a is projected onto a photo plate, light screen or the like 23 whence it impinges upon a photoresponsive or photosensitive cell 24. The photoresponsive cell 24 converts the light into corresponding electrical signals which are amplified in a suitable amplifier and any other desired equipment 25 such as, for example, a multivibrator of the type of the multivibrator 13 of the photoresponsive receiver 30. The output of the amplifier and multivibrator 25 is supplied to an indicator or measuring instrument 26.

Figure 2:
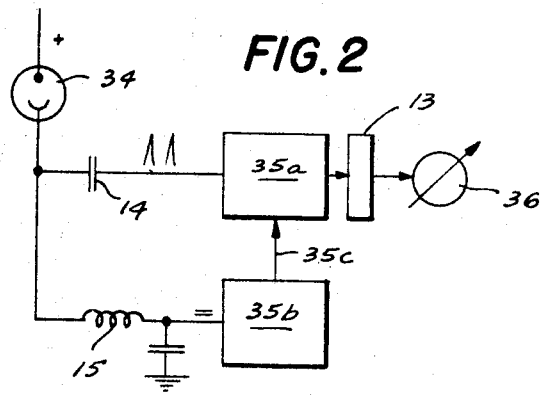
FIG. 2 is a schematic block diagram of an amplifier circuit which may be utilized in the system of FIG. 1.

FIG. 2 shows an amplifier circuit which may be utilized in the visibility measuring system of FIG. 1. The amplifier circuit accounts for the reduced visual range of the light pulse producing lamps during daylight. A pulse amplifier 35a is connected between a coupling capacitor 14 in the output of the photocell 34 and the multivibrator 13 in the photoresponsive receiver 30. The pulse amplifier has a control characteristic curve.

The pulse amplifier 35a amplifies the electrical pulses produced by the photocell 34 under the control of a control amplifier 35b which amplifies background light or daylight, the pulses produced by said photocell being integrated in an integrator 15 before they are amplified by the control amplifier 35b. The regulation or control of the amplification operation of the pulse amplifier 35a under the control of the control amplifier 35b is similar to an automatic volume control system. The amplifier circuit functions to decrease the amplification of the pulses as daylight increases in intensity so that the visual range of the radiated light pulses decreases. The control characteristic curve of the pulse amplifier 35a is selected for adjustment so that it follows a human eye in senstivity to light.

FIG. 3 is an embodiment of a light pulse producing lamp which may be utilized in the visibility measuring system of FIG. 1. The lamp of FIG. 3 radiates light pulses omnidirectionally. A spark discharge vessel 40 is filled with a rare gas and comprises two major electrodes having a well defined breakdown voltage, determined by the distance between the electrodes as well as the gas and the gas pressure. Instead of this, fixing of the lamp by means of a firing control circuit may also be provided. In this case, as well known, an auxiliary ignition electrode in the discharge lamp has to be provided. The electrodes of the spark discharge vessel 40 are connected to capacitors 42a and 42b via low-inductance electrical conductors 41a and 41b, respectively.

The capacitors 42a and 42b are periodically charged from a source E of electrical power via a high voltage step up transformer 46, a rectifier 45, a high voltage capacitor 44 and a charging resistor 43. The high voltage capacitor charges the capacitors 42a and 42b via the charging resistor 43 which may be varied in resistance to vary the frequency of occurrence or rate of the light pulses produced by the spark discharge vessel 40. The frequency of the light pulses produced by the spark discharge vessel 40 may be controlled or varied by an ignition electrode rather than the charging resistor 43. In such a case, the pulse rate corresponds to the ignition pulses supplied by the ignition electrode.

The spark discharge vessel 40 is positioned at the focal point of a parabolic reflector 47 which directs the light produced by said vessel and directed to said reflector in beams or rays 49a, as beams or rays 49b parallel to its optical axis. The beams or rays of light 49b impinge upon the outer surface of a conical reflector 48 which is coaxially positioned with the parabolic reflector 47 and which radiates the light rays or beams 49c omnidirectionally.

The parabolic and conical reflector arrangement of the lamp of FIG. 3 is more economical than a zone lens arrangement. In bright sunshine and at an energy of one Joule per light pulse for a light pulse of 0.5 microsecond duration, during good visibility, the system is effective at a distance of 3.6 kilometers between the lamp and the photoresponsive receiver. This is a sufficient factor for airfield visibility measuring applications of the system.

The visibility measuring system of the present invention utilizes a small amount of electrical power and may therefore be energized by storage batteries, so that it is flexible and does not require cable networks or complex connections. The frequencies of occurrence of the light pulses produced by the light pulse producing lamps and the indicating scale of the indicator 36 must correspond, the sum total of the light pulses produced by all the lamps being taken into account.

Since the light pulse producing lamps radiate omnidirectionally, fouling or dirtying of lenses does not adversely affect the operation of the system. This is due to the fact that fouling or dirtying has a dispersive rather than an absorptive effect. The lamps may comprise known types for producing light pulses which may operate for years uninterruptedly and without the need for servicing.

In the case of the power saving operation with directed narrow beam transmitters and a broad reception angle receiver, a cleaning of cover plates of the lamps is necessary, if the receiver, due to dirty surfaces, fails to indicate the right value. However, in contrast with omni-directional mode of operation, the narrow beam lamps allow savings of about 90% of the battery power.

While the invention has been described by means of specific examples and in specific embodiments, I do not wish to be limited thereto, for obvious modifications will occur to those skilled in the art without departing from the spirit and scope of the invention.

What I claim is:

1. A system for measuring visual range, comprising
   a plurality of light pulse producing lamps positioned in alignment in spaced relation from each other, the pulse repetition frequency of the light pulses produced by each of said lamps being of a predetermined magnitude so that said pulses are produced at predetermined time intervals; and
   photoresponsive receiver means for sensing all light pulses produced by said lamps within its range of sensitivity, said photoresponsive receiver means being positioned in spaced relation from said lamps and having an optical axis at an acute angle with the alignment of lamps, whereby each of said lamps is positioned a predetermined distance from said photoresponsive receiver means, said photoresponsive receiver means including indicating means for indicating the number of light pulses sensed during a predetermined measurment period being longer than the length of the longest of said predetermined time intervals at which said light pulses are produced, the total number of light pulses during each of said predetermined longer measurement periods thus being an indication of the number of lamps sensed and thereby of the visual range to be measured.

2. A system for measuring visual range, comprising
   a plurality of light pulse producing lamps positioned in alignment in spaced relation from each other, the pulse repetition frequency of the light pulses produced by each of said lamps being of a predetermined magnitude so that said pulses are produced at predetermined time intervals; and
   photoresponsive receiver means for sensing all light pulses produced by said lamps within its range of sensitivity, said photoresponsive receiver means being positioned in spaced relation from said lamps and having an optical axis at an acute angle with the alignment of lamps in a manner whereby each of said lamps is positioned a determined distance from said photoresponsive receiver means corresponding to a determined visual range different from that associated with the others of said lamps, said photoresponsive receiver having an amplification factor dependent upon the intensity of the ambient daylight and including indicating means for indicating the number of light pulses sensed during a predetermined measurement period being longer than the length of the longest of said predetermined time intervals at which said light pulses are produced, the total number of light pulses during each of said predetermined longer measurement periods thus being an indication of the number of lamps sensed and thereby of the visual range to be measured.

3. A system for measuring visual range, comprising
   a plurality of light pulse producing lamps positioned in alignment in spaced relation from each other, the pulse repetition frequency of the light pulses produced by each of said lamps being of a predetermined magnitude so that said pulses are produced at predetermined time intervals; and
   photoresponsive receiver means for sensing all light pulses produced by said lamps within its range of sensitivity, said photoresponsive receiver means being positioned in spaced relation from said lamps, and aligned with respect to the receiver in a manner whereby each of said lamps is positioned a determined distance from said photoresponsive receiver means corresponding to a determined visual range different from that associated with the others of said lamps, said photoresponsive receiver means including analog indicating means for indicating the number of light pulses sensed during a predetermined measurement period being longer than the length of the longest of said predetermined time intervals at which said light pulses are produced, the total number of light pulses during each of said predetermined longer measurement periods thus being an indication of the number of lamps sensed and thereby of the visual range to be measured.

4. A system for measuring visual range as claimed in claim 3, wherein the frequency of occurrence of the light pulses produced by each of said lamps is substantially one pulse per second.

5. A system for measuring visual range as claimed in claim 3, wherein the frequency of occurrence of the light pulses produced by each of said lamps is in a range of 0.9 to 1.1 pulse per second.

6. A system for measuring visual range as claimed in claim 3, further comprising a voltage supply for each of said lamps comprising a storage battery and current-stabilizing means for providing a substantially constant current to the corresponding lamp.

7. A system for measuring visual range as claimed in claim 3, further comprising means at each of said lamps for radiating the light pulses produced in one of the infrared and ultraviolet range.

8. A system for measuring visual range on the surface of a body of water, comprising
   a plurality of buoys;
   a plurality of light pulse producing lamps positioned in alignment in spaced relation from each other, the pulse repetition frequency of the light pulses produced by each of said lamps being of a predetermined magnitude so that said pulses are produced at predetermined time intervals, each of said lamps being mounted on a corresponding one of said buoys; and
   photoresponsive receiver means for sensing all light pulses produced by said lamps within its range of sensitivity, said photoresponsive receiver means being positioned on land in spaced relation from said lamps and having an optical axis at an acute angle with the alignment of lamps in a manner whereby each of said lamps is positioned a determined distance from said photoresponsive receiver means corresponding to a determined visual range different from that associated with the others of said lamps, said photoresponsive receiver including analog indicating means for indicating the number of light pulses sensed during a predetermined measurement period being longer than the length of the longest of said predetermined time intervals at which said light pulses are produced, the total number of light pulses during each of said predetermined longer measurement periods thus being an indication of the number lamps sensed and thereby of the visual range to be measured.

9. A system for measuring visual range at a landing strip, comprising
   a plurality of light pulse producing lamps positioned in alignment in the direction of length of and in proximity with said landing strip in spaced relation from each other, the frequency of occurence of the light pulses produced by each of said lamps being of a predetermined magnitude so that said pulses are produced at predetermined time intervals
   phototube means connected to an amplifier having an amplification factor dependent upon the ambient illumination; and photoresponsive receiver means for sensing all light pulses produced by said lamps within its range of sensitivity, said photoresponsive receiver means being positioned in spaced relation from said lamps in a manner whereby each of said lamps is positioned a determined distance from said photoresponsive receiver means corresponding to a determined visual range different from those of the others of said lamps, said photoresponsive receiver including analog indicating means for indicating the number of light pulses sensed during a predetermined measurement period being longer than the length of the longest of said predetermined time intervals at which said light pulses are produced, the total number of light pulses during each of said predetermined longer measurement periods thus being an indication of the number of lamps sensed and thereby of the visual range to be measured.

10. A system for measuring visual range at a landing strip as claimed in claim 9, further comprising a plurality of conventional lamps positioned in alignment in spaced relation from each other along said landing strip, connecting means connecting each of said light pulse producing lamps to a corresponding one of said conventional lamps in a manner whereby each of said light pulse producing lamps is energized via the corresponding conventional lamp, and frequency varying means at each of said light pulse producing lamps for varying the frequency of occurrence of the light pulses produced by each of said light pulse producing lamps in accordance with variations in intensity of the corresponding conventional lamp.

11. A system for measuring visual range at a landing strip as claimed in claim 9, wherein said lamps are positioned before said landing strip in the approached direction and said photoresponsive receiver means is positioned aboard an aircraft approaching said landing strip.

12. A system for measuring visual range at a landing strip as claimed in claim 9, further comprising additional photoresponsive receiver means positioned aboard an aircraft approaching said landing strip, said lamps being positioned before said landing strip in the approach direction.

13. A system for measuring visual range, comprising a plurality of light pulse producing lamps positioned in alignment in spaced relation from each other, the pulse repetition frequency of the light pulses produced by each of said lamps being of a predetermined magnitude so that said pulses are produced at predetermined time intervals, said pulse repetition frequency of the light pulses produced by each of said lamps being independent of the pulse repetiton frequency of the light pulses produced by the others of said lamps; and photoresponsive receiver means for sensing all light pulses produced by said lamps within its range of sensitivity, said photoresponsive receiver means being positioned in spaced relation from said lamps and having an optical axis at an acute angle with the alignment of lamps in a manner whereby each of said lamps is positioned a determined distance from said photoresponsive receiver means corresponding to a determined visual range different from those of the others of said lamps, said photoresponsive receiver means including means for indicating the number of light pulses sensed during a predetermined measurement period being longer than the length of the longest of said predetermined time intervals at which said light pulses are produced, the total number of light pulses during each of said predetermined longer measurement periods thus being an indication of the number of lamps sensed and thereby of the visual range to be measured.

14. A system for measuring visual range as claimed in claim 13, wherein the frequency of occurrence of the light pulses produced by each of said lamps corresponds to the distance of the lamp from said photoresposive receiver means.

15. A system for measuring visual range as claimed in claim 13, wherein the frequency of occurrence of the light pulses produced by each of said lamps increases as the distance of the lamp from said photoresponsive receiver means increases.

References Cited

UNITED STATES PATENTS

| | | | |
|---|---|---|---|
| 2,999,999 | 9/1961 | Bartelink | 340—31 |
| 3,126,521 | 3/1964 | Brady | 340—25 |

RALPH G. NILSON, *Primary Examiner.*

ARCHIE R. BORCHELT, *Examiner.*

M. ABRAMSON, *Assistant Examiner.*